Patented Aug. 3, 1954

2,685,575

UNITED STATES PATENT OFFICE 2,685,575

POLYMERIZATION PROCESS AND CATALYST

Randall G. Heiligmann and Frederick Benington, Columbus, Ohio, assignors, by mesne assignments, to The Borden Company, New York, N. Y., a corporation of New Jersey No Drawing. Application January 22, 1951, Serial No. 207,226

10 Claims. (Cl. 260—83.7)

The invention here disclosed shows the polymerization of ethylenically unsaturated organic compounds by the application thereto of a new catalyst which is a hydride of boron.

The catalyst of the present invention, disclosed herein, is broadly an inorganic compound containing elements which are linked by a single shared electron, such as the boron hydride known as diborane, the preferred polymerizable compound being one containing ethylenic unsaturation, such as ethylene under pressure, or styrene, or the like. While the diborane and similar compounds are hereinafter referred to as catalysts, it is understood that they actually function as initiators as is commonly the case in polymerization reactions.

A wide variety of compounds containing ethylenic unsaturation have been polymerized by the aid of a considerable number of catalyst substances, but in most of such polymerization reactions various difficulties are encountered. Thus, in the polymerization of ethylene by oxygen or oxygen-yielding compounds, excessively high pressures may be required which if used are expensive to obtain and, when such catalysts as benzoyl peroxide, hydrogen peroxide, potassium persulfate, and similar catalyst substances are used, it is found that oxygen or fragments of the catalysts tend to remain in the polymer either as such or combined with the polymer, and such oxygen atoms or catalyst fragments act as a focal point for the attack by other substances. Furthermore, many of the peroxide type catalysts or activators are sensitive to both heat and mechanical shock.

According to the present invention it is found that a compound in which there are two atoms linked through a single shared electron shows a high and very efficient activity as a polymerization catalyst for compounds having non-aromatic doubly linked carbon atoms in general. The preferred embodiment of the catalyst is the compound known as diborane, $B_2H_6$, and its homologs and analogs up to about $B_{10}H_{14}$.

The exact method of operation of the catalyst is still unknown. A molecular structure involving linkage by the sharing of single electrons leads to an inherent instability and it is probable that the catalyst functions by virtue of the generation of highly reactive fragments which may be free radicals or may be reactive hydrogen or the like. In any event, the catalyst compound, being completely inorganic and free from oxygen, does not give rise to oxygen-bearing fragments to become part of the polymer chain as is the case with peroxide type catalysts and, accordingly, the resulting polymer is much more stable than is the case when other types of catalysts are used.

Thus, the primary objects of the present invention are to utilize a new catalyst for the polymerization of doubly linked or ethylenically unsaturated organic compounds, to prepare polymers having superior properties, and to polymerize these compounds by the use of componds having single electron bonds between molecular components, such as the various compounds formed from boron and hydrogen only. Other objects and details of the invention will be apparent from the following description.

In utilizing the present invention there are involved, primarily, two elements, the catalyst and the polymerizable monomer. For the catalyst there is used a compound having therein at least one interatomic linkage in which but a single electron is shared between two atoms. The compound may have an unlimited number of such single electron bonds. The representative compound and the preferred catalyst is diborane, having the empirical formula $B_2H_6$. Other similar boron compounds having higher molecular weights are known up to about $B_{10}H_{14}$ and these may also be used as polymerization catalysts. Not all of these compounds, particularly those of intermediate molecular weight, are sufficiently stable to be prepared in usable quantities, but those which can be prepared are, in general, excellent catalysts. The structure of these compounds has been discussed by L. Pauling in "The Nature of the Chemical Bond," 2nd edition, Cornell University Press, Ithaca, New York, 1945, p. 259 et seq. In discussing these structures he states, "the fundamental difficulty is that there are not enough valence electrons in the molecules to bond the atoms together with electron pair bonds." He further states that "it is to be expected that, in general, molecules containing one (shared) electron (in a) bond will be less stable than those in which all the stable bond orbitals are used in electron-pair-bond formation." While it is recognized that such compounds involve many resonating structures, possibly including some which do not have single-electron bonds, we will refer to compounds having this characteristic deficiency of valence electrons as "single-electron bonded compounds."

The degree of stability and the reactivity of the hydrides of boron are well shown in an abstract presented by McCarty, Bragg, and Norton in the October 13, 1950, issue of "Science," vol. 112, p. 425, in which these writers say:

"A number of hydrides of boron, compounds of the general formula $B_xH_y$, are known. Certain of these decompose or react readily at temperatures near 100° C.; in such thermal reactions perhaps all boron hydrides play some role. Consequently, the thermal decomposition of any boron hydride presents an intricate problem in reaction kinetics, whose solution involves establishment of a complicated mechanism for the reaction. Diborane ($B_2H_6$) is a gaseous hydride of boron which undergoes rapid decomposition at 100° C. and may be used as a starting material for preparation of other boron hydrides.

"The kinetic studies of the thermal decomposition of diborane reported here are of three kinds. First, the rate of increase of total pressure has been measured as a function of temperature and initial pressure. Three conclusions are drawn from the results: the order of the rate-controlling step is 1.5; the reaction is homogeneous in glass; and the activation energy of the rate-controlling step is 27.4±0.7 kcal./mole.

"Second, the rate of formation of hydrogen has been measured. The results confirm the value 1.5 (for) the order, and indicate an activation energy of 25.5±0.5 kcal./mole. The difference between activation energies is due to temperature effects on secondary reactions.

"Third, the mass spectrometer has been used to follow the reaction; in this way the concentrations of several participant species were measured. It is concluded (1) that the order of the step controlling the rate of disappearance of diborane is 1.5, (2) that dihydropentaborane ($B_5H_{11}$) appears to be an intermediate in the formation of most other boranes from diborane, and (3) that the formation of pentaborane ($B_5H_9$) from dihydropentaborane is probably a simple first order step.

"The reaction scheme proposed to account for these observations is:

$$B_2H_6 \rightleftharpoons 2BH_3$$
$$B_2H_6 + BH_3 \rightarrow \text{Intermediate products}$$
$$\text{Intermediate products} + B_2H_6 \rightarrow B_5H_{11} + H_2$$
$$B_5H_{11} \rightarrow B_5H_9 + H_2$$
$$B_5H_{11} \rightarrow \text{solids}, B_2H_6$$

Diborane is conveniently prepared by the method of Stock, Martine, and Sütterlin (Berichte der Deutschen Chemischen Gesellschaft 67B, 396 (1934)). It possesses a boiling point of −92.5° C., a melting point of −165.5° C., and a critical temperature of approximately 32° C. This compound so prepared, or its homologs or analogs, may be used for the polymerization reaction and, being gaseous, it is very conveniently handled with respect to polymerizable substances, such as normally gaseous olefins.

The gaseous character of the catalyst makes it particularly suitable for continuous polymerization processing in a process in which continuing streams of polymerizable material and the gaseous catalyst are delivered under appropriate conditions of temperature and pressure to a reactor and unpolymerized portions are removed from the reactor, purified, and recycled.

The polymerizable material may be any substance having doubly linked non-aromatic carbon atoms, and the reaction appears to be a general one. Preferred materials are such substances as ethylene, methyl methacrylate, vinylidene chloride, vinyl acetate, and styrene. Copolymers of these ethylenic and active vinyl monomers and of other monomers may also be prepared in the presence of diborane. Compositions of a wide range of properties may be readily realized by varying the relative amounts of the initial comonomers, as is well known in the art.

In utilizing the present invention, the catalyst, preferably in gaseous form, and the monomer or mixture of monomers are combined under appropriate conditions of temperature and pressure. In the preferred embodiment, utilizing diborane and ethylene, the diborane, which is gaseous at room temperature, may be added at low pressure to the reactor, with the ethylene under pressure added after the catalyst, and the appropriate pressure built up in the usual way. The reaction occurs at good speed to produce an excellent polymer of ethylene which usually shows a molecular weight within the range between 10,000 and 50,000, preferably about 20,000, a softening point usually within the range between 115° C. to 150° C., a density of approximately 0.91, a dielectric constant of about 2.26 at 60 cycles, and a breakdown voltage measurement of 1000 to 1500 volts per mil thickness for thin films.

The diborane may be introduced into the reactor until a small pressure is built up. When the appropriate amount of diborane has been added to the reactor, a supply of ethylene is delivered to the same reactor under pressure until the gauge pressure is built up to a point within the range between about 1200 and 10,000 pounds per square inch. The weight of diborane used may be as low as 0.1% of the total weight or as high as 20%. The reactor is then allowed to stand at the desired pressure, repressuring being accomplished at intervals as the polymerization reduces the effective pressure, if desired. This may be done merely by the addition of further quantities of compressed ethylene, or a slow stream of ethylene under pressure may be carried through the reactor; in either event it is usually desirable that an appropriate amount of diborane be added to the ethylene supply in order to insure the maintenance of an appropriate catalyst concentration in the reactor.

After times up to about 25 hours, depending on catalyst concentration and monomer pressure, appreciable amounts of polymer are obtained in the reactor. When this stage is reached, the ethylene supply may be discontinued, the ethylene pressure released, the closures on the cylinder removed, and the solid polymer cleared from the reactor in any appropriate manner. The resulting polymer shows the properties above outlined.

*Example 1*

A cylindrical reactor was charged with a mixture of ethylene and diborane until the diborane amounted to 0.2% by weight of the charge. The temperature was brought to 55° C. and the reaction mixture was built up to a pressure of 2150 p. s. i. After 20 hours it was found that at this pressure and temperature a polymer was formed having a softening point of 111° C. A second run on the same proportion of ethylene to catalyst and the same temperature at a pressure of 2300 p. s. i. yielded a similar polymer having a softening point of 113° C. A third run at the same temperature with the same catalyst concentration but a pressure of 4350 p. s. i. yielded a polymer with a softening point of 145° C. A fourth run on the same catalyst concentration and temperature, but a pressure of 4500 p. s. i. gave a polymer having a softening point of 123°

Thus, the catalyst is effective and the reaction works excellently with gaseous olefins and, moreover, it polymerizes the gaseous olefins under relatively very mild conditions of pressure and temperature.

The invention is not, however, limited to the gaseous olefins represented by ethylene, but it applies equally well to the normally liquid unsaturates such as methyl methacrylate and styrene, which are readily polymerized at room temperature and atmospheric pressure as shown by the following examples:

Example 2

A stainless steel pressure reactor, previously cooled to −52° C. and from which oxygen had been removed by a stream of nitrogen, was charged with 10 parts by weight of methyl methacrylate and 1 part of diborane. The mixture was allowed to warm up to room temperature and stand 20 hours in the closed system. Upon opening the reactor, 13.2 parts per 100 of monomer of a solid polymethyl methacrylate were found.

Example 3

The procedure of Example 1 was repeated except that 10 parts of benzene were incorporated in the charge. A solid product similar to that of Example 1 was realized on pouring the solution into excess methanol.

Example 4

One gram of diborane was placed in a stainless steel pressure reactor, previously cooled to −52° C., and sufficient ethylene added to produce a gauge pressure of 5000 p. s. i. at a temperature of 55° C. The diborane represented 0.2% of the ethylene by weight. The reaction system was held at this latter temperature for a period of 24 hours. Upon opening the reactor, a white solid polymer of ethylene was found, possessing a softening point of 134° C. and an average molecular weight of about 40,000.

Example 5

Into a stainless steel pressure reactor previously cooled to −50° C. were charged 10 parts of monomeric styrene and 1 part of diborane. The reactor was closed and allowed to warm up to room temperature, and the reactor maintained at this room temperature for 20 hours.

11.5 parts (per 100 of monomer) of solid polystyrene were found upon opening the pressure vessel after the indicated reaction period.

Similar results were obtained with the several methyl and ethyl styrenes, both alpha-methyl and para-methyl styrene, as well as 2,4-dimethyl styrene.

Example 6

Equimolar parts of styrene and butadiene were charged into a previously cooled reaction pressure vessel and sufficient diborane added to give a catalyst concentration of 5% by weight of the total monomer charged. The system was allowed to warm up to room temperature and was maintained under these conditions for 12 hours. Upon opening the reactor, a solid product was found which proved to be a copolymer of the two monomeric constituents charged.

Example 7

A precooled stainless steel reactor was charged with 1 part diborane and 10 parts of monomeric trifluorochloro ethylene. The reactor was maintained at 68° C. for a period of 24 hours. At the end of this period the gases were discharged leaving a white solid shown to be a polymer of trifluoroethylene.

The application of the preferred diborane catalyst to the polymerization of normally gaseous olefins, such as ethylene, is particularly advantageous, in that the use of a gaseous catalyst facilitates a continuous polymerization process. Such a continuous process possesses obvious advantages. While the polymerization of gaseous olefins, such as ethylene, is a preferred embodiment of this invention, diborane and similar one-electron bonded compounds are applicable to other known polymerization techniques, such as mass and solution polymerization. Hydroxyl-containing compounds and their nitrogen analogs commonly react violently with diborane and similar compounds, and preferably should be excluded from any system in which these catalysts are to be used.

It has been found that the process of this invention is applicable to organic compounds having non-aromatic (C=C) carbon-to-carbon unsaturation. A class to be preferred is that of ethylenically unsaturated compounds wherein a terminal methylene, CH$_2$, is joined by an ethylenic double bond to the adjacent carbon atom

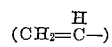

Compounds containing this terminal methylene group and polymerizable by the present invention include those having a single ethylenic unsaturation, such as ethylene, propylene, and the butylenes; methyl methacrylate, ethyl methacrylate, ethyl acrylate, n-butoxyethyl methacrylate, and alpha-chloroacrylic acid; vinyl chloride, vinyl fluoride, vinylidene fluoride, and vinylidene chloride; the whole group of unsaturated fluorochloro compounds; vinyl acetate, vinyl laurate, and vinyl stearate; N-vinyl phthalimide; styrene, alpha-methylstyrene, vinyl naphthalene, and vinyl dibenzofurane; and other vinyl derivatives such as vinyl methyl ether, vinyl pyridine, vinyl thiophene, and ethyl vinyl ketone. In addition, compounds having more than a single unit of ethylenic unsaturation are similarly readily polymerizable. These compounds include such representative substances as butadiene, isoprene, piperylene, the several isomeric dimethyl butadienes, the several methylethyl and diethyl butadienes, and the homologous series built thereon, as well as the various di-heptenes, dioctenes, dinonenes, and the like, and also such compounds as myrcene, alloocymene, and analogous compounds. All of the above listed compounds may be polymerized singly or may be copolymerized with a wide range of other unsaturates, of which the above list gives representative members.

Copolymers of these active vinyl monomers may also be prepared in the presence of diborane. Compositions of a wide range of properties may be readily realized by varying the relative amounts of the initial comonomers.

In addition to the compounds containing a single ethylenic double bond, it has been found that organic compounds having a plurality of ethylenic double bonds may be polymerized or copolymerized in the presence of diborane. In the case of polymerizable organic compounds containing more than one ethylenic double bond, it is preferred that the unsaturated centers be conjugated. In the case of compounds containing isolated ethylenic double bonds, it is preferred to have them conjugated with a carboxylic acid group, nitrile group, nitro group, sulfone, and/or sulfoxide group.

Diborane is also effective in cases where the polymerizable ethylenic group is not conjugated with such activating groups, this being exemplified by diallyl phthalate, divinyl benzene, and diallyl carbonate.

While compounds with a terminal methylene group are preferred, it has been found that diborane is effective with unsaturates such as maleic and fumaric esters which contain no terminal unsaturation. Of a special value are the copolymers of these alpha, beta-ethylenic dicarboxylic acid esters with other vinyl monomers containing terminal methylene groups.

It is, of course, advantageous at times to employ diluents in order to modify the kinetics of the reaction and so influence the properties of the ultimate compositions. On the other hand, it is occasionally desirable to moderate the reactivity of the diborane. In this case, it has been found advantageous to employ tetrahydrofurane, an excellent solvent for the catalyst.

Interesting and valuable results are also obtainable by the use of "seeds" in the form of residues of various types derived from prior polymerizations. For this purpose, especially useful materials are the partially polymerized residues of unsaturates containing either residual catalyst or catalyst breakdown products derived from prior reactions.

It is obvious that, under the present teaching and the wide variety of reactants cited, a multiplicity of reaction conditions may exist and that the optimum for a particular system will depend primarily upon the nature of the starting materials and the physical attributes desired in the ultimate product. Thus, both the liquid and gas phase reactions may be carried out with this catalyst. Moreover, supplementary activations may be practiced with, for instance, light waves of from 3000 to 5000 angstrom units, this frequently permitting initiation at a lower thermal energy level.

It is advisable that, in order to obtain optimum results, the reaction system should be essentially free of water and gaseous oxygen. Providing these precautions are observed, diborane exemplifies a catalyst and/or activator which does not possess the several shortcomings and disadvantages inherent in peroxide-type catalysts. Thus, it minimizes the tendency toward crosslinkage, yields polymers free of oxidizing catalyst fragments, and is effective for the polymerization of a wide range of unsaturates in the presence of a wide variety of diluents. Furthermore, since it is gaseous under ordinary conditions of temperature and pressure, it lends itself more readily to continuous polymerization processes for gaseous monomers.

Thus, the catalyst of this invention polymerizes organic monomers under mild conditions of temperature and/or pressure to yield polymers with superior properties.

While there are above disclosed but a limited number of embodiments of the present invention it is possible to provide many other embodiments without departing from the inventive concept herein disclosed, and it is therefore desired that only such limitations be imposed on the appended claims as are stated therein or required by the prior art.

The invention claimed is:

1. In a polymerization process for ethylenic unsaturates at substantially elevated pressure, a polymerization catalyst comprising a hydride of boron.

2. In a polymerization process for ethylenic unsaturates at substantially elevated pressure, a polymerization catalyst comprising diborane.

3. A polymerization process comprising the steps, in combination, of mixing together a boron hydride having a molecular weight within the range between 26 and 130 and a polymerizable organic compound having at least one ethylenic linkage in the molecular structure thereof at a substantially elevated pressure.

4. The polymerization process comprising the steps, in combination, of pressuring a polymerizable gaseous olefin in the presence of diborane to produce an olefinic polymer.

5. The polymerization process comprising the steps, in combination, of pressuring ethylene in the presence of diborane to produce an ethylene polymer.

6. A polymerization process comprising the steps, in combination, of compressing ethylene to a pressure within the range between 1200 and 4500 p. s. i. at a temperature of approximately 55° C. and passing a continuing stream of compressed heated ethylene through a reaction zone in the presence of a gaseous inorganic polymerization catalyst comprising diborane.

7. A polymerization process comprising the steps, in combination, of mixing together a boron hydride and methyl methacrylate at a substantially elevated pressure to produce a methacrylate polymer.

8. A polymerization process comprising the steps, in combination, of mixing together a boron hydride and styrene at a substantially elevated pressure to produce a styrene polymer.

9. A polymerization process comprising the steps, in combination, of mixing together a boron hydride and a mixture of styrene and butadiene at a substantially elevated pressure to produce a copolymer of styrene and butadiene.

10. A polymerization process comprising the steps of mixing together trifluorochloroethylene and diborane at a substantially elevated pressure to produce a polymer of trifluorochloroethylene.

References Cited in the file of this patent

UNITED STATES PATENTS

| Number | Name | Date |
| --- | --- | --- |
| 2,416,106 | Linn et al. | Feb. 18, 1947 |
| 2,475,643 | Seebold | July 12, 1949 |
| 2,550,695 | Hillyer et al. | May 1, 1951 |
| 2,558,561 | Safford | June 26, 1951 |

OTHER REFERENCES

Simons, Ind. & Eng. Chem., vol. 32, No. 2, Feb. 1940, pages 178–183.

Plastics and Resins, Sept. 1945, pp. 32–34.

Neher, AIEE Transactions, vol. 64 (1945), pages 911–922.

Stock et al., Berichte der Deutschen Chemischen Gesellschaft 67B, 396 (1934).